Figure 1:
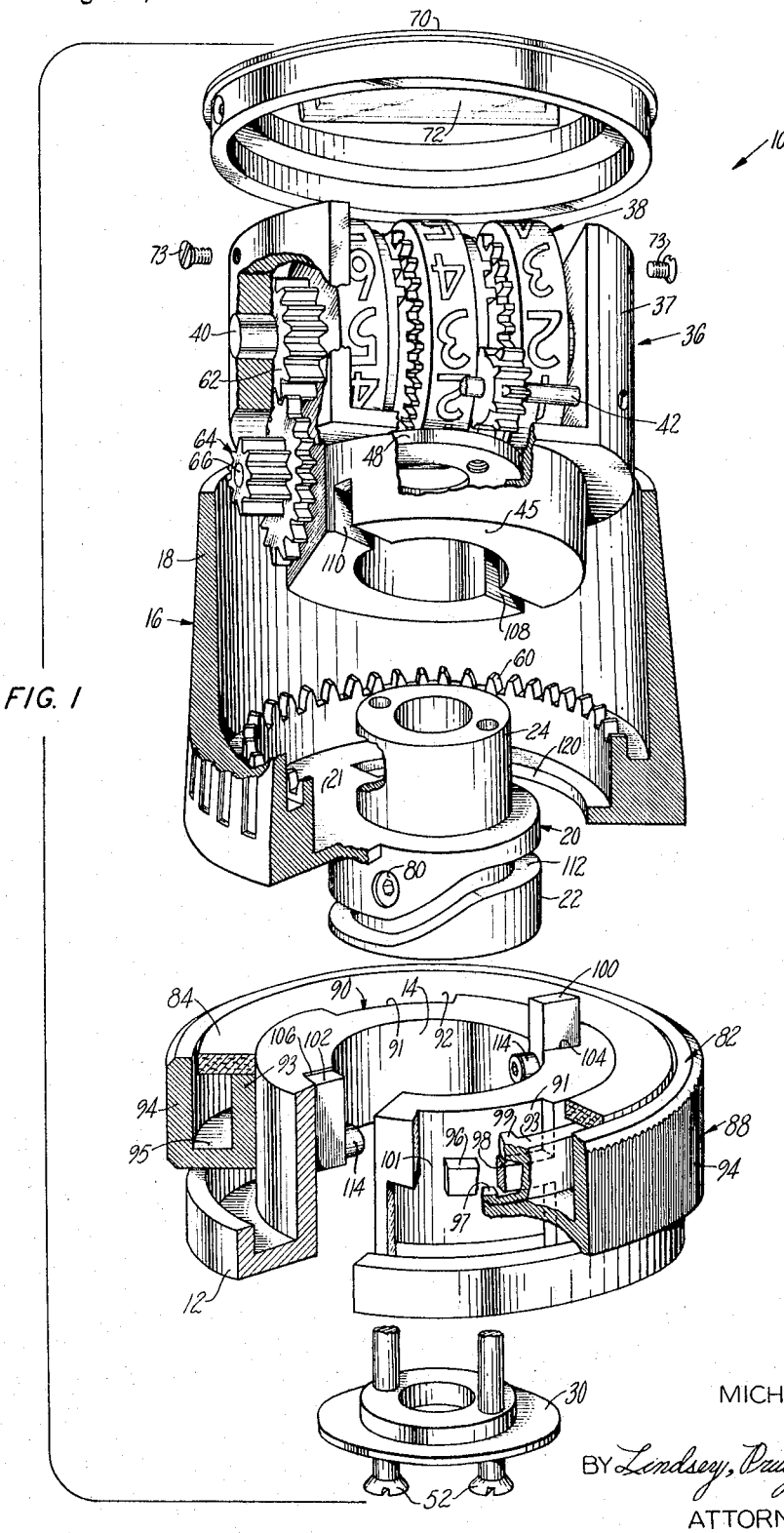

Jan. 24, 1967  M. S. JUHAS  3,300,131
INDICATING DEVICE
Filed Aug. 14, 1964  2 Sheets-Sheet 1

INVENTOR.
MICHAEL S. JUHAS
BY Lindsey, Prutzman and Hayes
ATTORNEYS

Jan. 24, 1967    M. S. JUHAS    3,300,131
INDICATING DEVICE

Filed Aug. 14, 1964    2 Sheets-Sheet 2

INVENTOR.
MICHAEL S. JUHAS
BY Lindsey, Prutzman and Hayes
ATTORNEYS

United States Patent Office 3,300,131
Patented Jan. 24, 1967

3,300,131
INDICATING DEVICE
Michael S. Juhas, Torrington, Conn., assignor to Veeder
Industries Inc., a corporation of Connecticut
Filed Aug. 14, 1964, Ser. No. 389,615
8 Claims. (Cl. 235—103)

The present invention relates to indicating knobs of the type having a counting mechanism mounted within an adjustment knob for indicating the angular adjustment thereof, as for example the indicating knob shown in United States Patent 2,777,637 dated January 15, 1957, entitled, Shaft Revolution Counter, and useful for example for adjusting a potentiometer control shaft.

It is a primary aim of the present invention to provide in an indicating knob of the type described a new and improved arrangement for mounting the counting mechanism within the adjustment knob.

It is another aim of the present invention to provide in an indicating knob of the type described a new and improved arrangement for holding the counting mechanism against rotation while the adjustment knob is rotated.

It is another aim of the present invention to provide an economical and compact indicating knob having an adjustment knob which may be rotated for convenient and accurate adjustment and which may be easily locked for accurate maintenance of its adjusted position.

It is a further aim of the present invention to provide a new and improved indicating knob of the type described having a compact assembly of parts of economical manufacture.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 2:
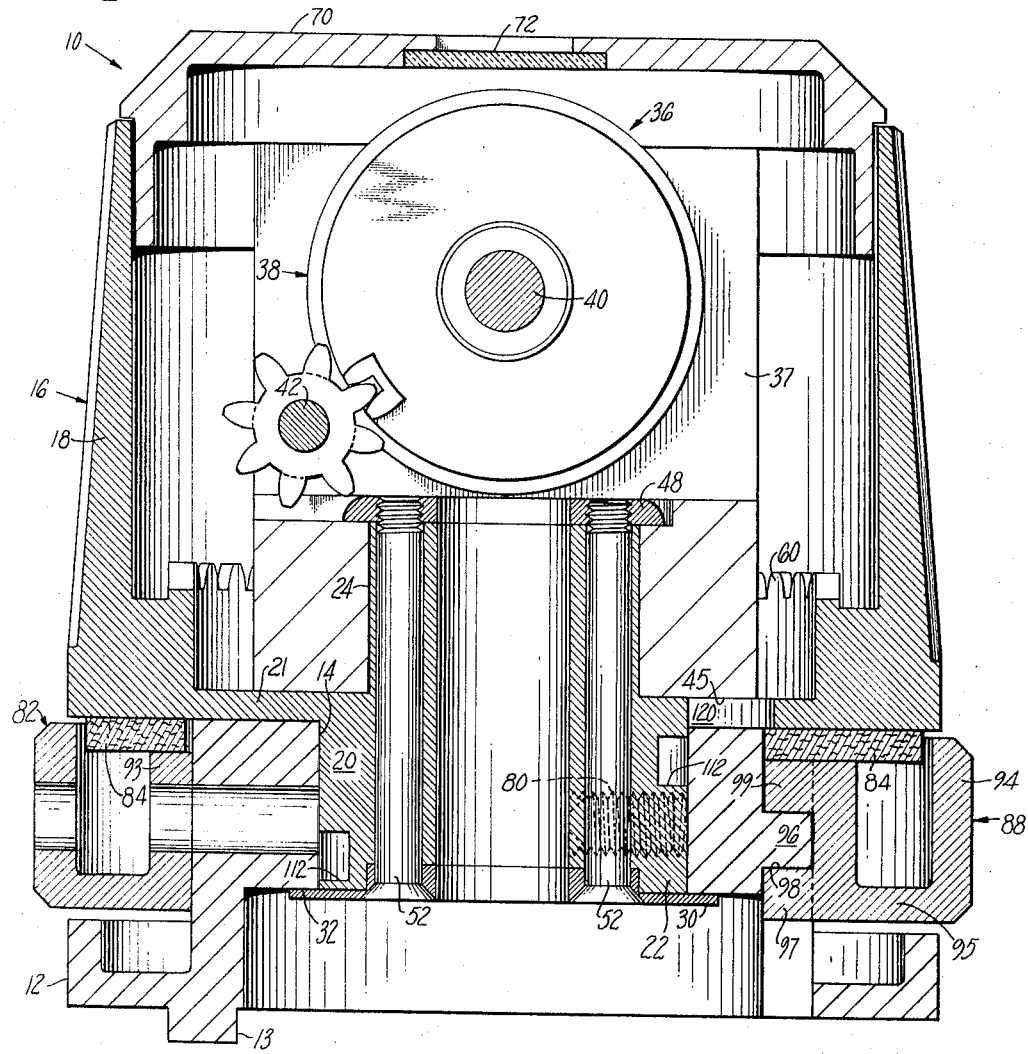

In the drawings:

FIG. 1 is an exploded perspective view, partly broken away and partly in section, of an embodiment of an indicating knob of the present invention; and FIG. 2 is an enlarged section view of the indicating knob of FIG. 1.

Referring now to the drawings in detail, an embodiment of an indicating knob of the present invention, generally denoted by the numeral 10, is shown to comprise a base or frame 12 having a depending lug 13 adapted for holding the base 12 against rotation when the indicating knob is mounted for adjustment of an associated device. The base 12 is provided with a suitable cylindrical support opening or bearing 14 for rotatably mounting an adjustment knob 16 having a knurled rim or knob portion 18, a central hub 20 and a web 21 connecting the hub and rim. The hub 20 is formed with an inner hub portion 22 rotatably mounted on the bearing 14 and an outer hub portion 24 of less diameter than the inner hub portion 22. The web 21 engages the outer face of the base 12 to provide axial support for the adjustment knob and a washer 30 is fixed to the inner end of the hub to overlie an inner face portion 32 of the base for axial retention of the adjustment knob on the base.

A counting module, generally denoted by the numeral 36, is shown comprising a counting module support 37 and a conventional counter mechanism 38 having three coaxial counter wheels. The counter wheels are mounted on a transversely extending shaft 40 and in the usual manner a transfer pinion shaft 42 is provided for rotatably supporting transfer pinions connecting adjacent higher and lower order counter wheels. The module support 37 is provided with an opening for mounting the counting module on the outer hub portion 24 for relative coaxial rotation with respect to the adjustment knob 16. The inner face 45 of the module support 37 is adapted to engage the web 21 and a washer 48 mounted at the outer axial end of the hub provides for retaining the counting module on the adjustment knob. In this regard, the axially spaced washers 30 and 48 are detachably secured at the ends of the hub 20 by fasteners 52 extending through axial openings in the hub and threaded to the outer washer 48.

A drive connection between the adjustment knob 16 and the counter mechanism 38 is provided in the shown embodiment by a crown gear 60 on the adjustment knob, a driven gear 62 on the counter shaft 40 and an intermediate compound idler gear 64 mounted on a stub shaft 66 fixed to the module support, which together provide a 1:10 ratio between the adjustment knob 16 and the counter. Theerfore for each full rotation of the adjustment knob 16 the lowest order counter wheel will be driven ten revolutions and thereby provide a count of 100 with the usual numeral sequence of 0–9 on each counter wheel. The indicating knob is provided with a cover or cap 70 having a viewing window 72 for reading the counter and in the shown embodiment with the cover fixed to the counting module support 37 by screws 73. As shown in FIG. 2, the cover 70 is dimensioned to conform to the outer end of the rim 18 for appearance and for providing an additional guide for the rotational movement of the adjustment knob. A set screw 80 is threaded into the hub 20 for direct connection of the adjustment knob 16 to a control shaft or the like (not shown) of an associated device and accordingly by angular adjustment of the knob 16 the shaft is similarly adjusted.

For locking the adjustment knob in any selected angular position a manually operable mechanism, generally denoted by the numeral 82, is provided for locking the knob 16 to the base 12. This locking mechanism 82 includes a friction washer 84 surrounding the base 12 for engagement with the inner face of the web 21 of the adjustment knob. The friction washer is retained against angular displacement relative to the base 12 by interfitting tongue and groove connections 90 therewith comprising diametrically opposed partially annular recesses or grooves 91 in the base and conforming tapered projections or tongues 92 on the friction washer. The friction washer is axially adjustable for locking the adjustment knob 16 by a secondary knob or locking ring 88 provided with an inner hub or flange 93 rotatable on the base 12, a knurled outer axial flange or rim 94 enclosing the friction washer 84, and a web 95 connecting the inner hub and outer rim. The inner hub 93 has a threadlike connection with the base 12 which includes diametrically opposed generally helically extending bars, threads or cams 96 (only one of which being shown in the views of the drawings) integrally formed with the base 12 inwardly of the grooves 91 and conforming diametrically opposed generally helically extending slots or grooves 98 on the locking ring which receive the bars 96. In the shown embodiment, each of the diametrically opposed slots 98 is formed by a pair of angularly spaced radial projections 97, 99 on the hub 93, and a recess 101 is provided in the base at an end of each of the bars 96 so that the locking ring may be readily installed by axial insertion thereof on the base. It should therefore be seen that the locking ring 88 can be rotated, in the clockwise direction as seen in FIG. 1, to force the friction washer 84 into engagement with the adjustment knob 16 to lock the knob 16 against rotation.

In order to hold the counting module 36 against rotation, a mechanism for locking the counting module support 37 to the base 12 is provided. In the embodiment shown, the locking mechanism comprises a pair of locking fingers or dogs 100, 102 axially reciprocable within diametrically opposed slots 104, 106 in the bearing 14, and the module support 37 is provided with diametrically opposed slots or recesses 108, 110 in alignment therewith for receiving the locking fingers. For operation of the locking fingers between an extended position, shown by the locking finger 100 in FIG. 1, where the finger is received in the respective recess in the module support and a retracted position, shown by the locking finger 102 in FIG. 1, where the finger is fully withdrawn from the respective recess, the inner portion 22 of the hub is provided with a peripheral camming slot 112 and the fingers are provided with suitable rollers or followers 114 which are received in the camming slot.

As the web 21 of the adjustment knob 16 lies between the base 12 and the counting module support 37, the web is provided with a suitable angular slot 120 which is shown to extend for substantially 270° and which is adapted to receive the extended locking fingers 100, 102. The camming slot is contoured to sequentially extend the locking fingers into locking position in the recesses 108, 110 in the module support and retain them fully extended for over 180° of rotation of the adjustment knob and so that one of the fingers 100, 102 is fully extended for locking the counting module throughout the entire 360° of rotation of the adjustment knob. More particularly, in the embodiment shown each of the locking fingers is retained in its fully extended position for approximately 225° of angular travel of the adjustment knob and is retained in its fully withdrawn position for approximately 100° of angular travel of the adjustment knob during which the web 21 covers the locking finger. Accordingly, the camming slot 112 functions to independently reciprocate the locking fingers to ensure that at least one of the locking fingers is fully extended to securely lock the counting module at all angular positions of the adjustment knob 16.

Thus it can be seen that the indicating knob of the present invention has a compact and economical assembly with the counter mechanism enclosed within the adjustment knob and with the counter mechanism held against rotation without play or backlash in the locking connection between the counting module and the base of the indicating knob. Additionally, the indicating knob of the present invention provides for direct and accurate adjustment of an associated device and for retention of the adjustment knob in any selected angular position.

As will be apparent to persons skilled in the art, various modifications and adaptations of the structure above described will become readily apparent without departure from the spirit and scope of the invention, the scope of which is defined in the appended claims.

I claim:

1. In an indicating device having a base, a knob rotatable on the base, and a counting module rotatably mounted coaxially within the knob, the improvement wherein the indicating knob further comprises locking means mounted on the base and actuated by the rotatable knob for holding the counting module against rotation, said locking means including a plurality of locking elements angularly spaced about the axis of the counting module and sequentially actuated by the knob for locking the module while the knob is rotated.

2. The improvement of claim 1 wherein the counting module has angularly spaced recesses for receiving the locking elements respectively, and wherein the locking means further comprises actuator means connected to the knob for sequentially extending the locking elements into and for withdrawing them from the recesses for locking the counting module at angularly spaced positions thereon.

3. In an indicating device having a base, a knob rotatable on the base, and a counting module rotatable on the knob, the improvement wherein the indicating knob further comprises locking means mounted on the base and actuated by the rotatable knob for locking the counting module to the base, said locking means comprising a plurality of angularly spaced locking elements reciprocable on the base, said counting module having a plurality of angularly spaced recesses for receiving the locking elements respectively, and cam means rotatable with the knob engageable with the locking elements for independent reciprocable operation thereof into and from the respective angularly spaced recesses.

4. The improvement of claim 3 wherein the knob comprises a hub with an inner portion rotatably mounting the knob on the base, wherein the locking elements are axially reciprocable on the base and wherein the cam is provided by an annular cam slot on the inner hub portion.

5. In an indicating device having a base, a knob rotatable on the base, and a counting module rotatable on the knob, the improvement wherein the indicating knob further comprises locking means mounted on the base and actuated by the rotatable knob for holding the counting module against rotation, said locking means including a pair of diametrically opposed locking elements axially reciprocable on the base between fully extended positions in locking engagement with the locking module and fully retracted positions, and cam means on the knob for independently reciprocating the locking elements between their fully retracted and fully extended positions while the knob is rotated.

6. The improvement of claim 5 wherein the cam means provides for retaining each of the elements in its fully extended position for more than 180° of rotation of the knob and with one of the elements in a fully extended position at all angular positions of the knob.

7. An indicating device comprising a base with an axial opening therein; a knob having a rim, a central hub with an inner axial end rotatably mounted within the axial opening of the base and an outer axial end, and a radial web intermediate the inner and outer axial ends connecting the rim and the hub; a counting module having a counting mechanism and a counting mechanism support rotatably mounted on the outer axial end of the hub; drive means connecting the knob and the counting mechanism; and locking means for locking the counting module to the base including axially extending slots in the base angularly spaced around said axial opening, axially extending recesses in the counting module support in alignment therewith respectively, and locking fingers reciprocable in the slots between extended positions received within the recesses and retracted positions withdrawn from the recesses; said knob web having an angular slot for sequentially receiving the locking fingers in their extended positions as the knob is rotated, said inner axial end of the hub having a peripheral cam groove and said locking fingers having followers received in the cam groove for timely and sequential extension of the locking fingers through the angular slot and into the support recesses and withdrawal of the locking fingers to their retracted positions.

8. The indicating device of claim 7 further comprising manually operable locking means for locking the knob to the base including a locking ring rotatable on the base coaxially with the knob, a friction washer between the locking ring and knob mounted on the base for axial displacement into locking engagement with the knob, said washer being connected to the base to prevent angular displacement thereon, and means for axially adjusting the locking ring upon angular adjustment thereof to axially displace the washer into engagement with the knob.

References Cited by the Examiner

UNITED STATES PATENTS

| | | | |
|---|---|---|---|
| 2,777,637 | 1/1957 | Matthew | 235—103 |
| 2,979,258 | 4/1961 | Van Alen | 235—103 |
| 3,202,127 | 8/1965 | Struble et al. | 116—115 |

RICHARD B. WILKINSON, *Primary Examiner.*

T. J. ANDERSON, *Assistant Examiner.*